United States Patent
Manabe (10) Patent No.: US 9,829,912 B2
(45) Date of Patent: Nov. 28, 2017

(54) SEMICONDUCTOR DEVICE (71) Applicant: RENESAS ELECTRONICS CORPORATION, Kanagawa (JP)

(72) Inventor: Yasutake Manabe, Kanagawa (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 102 days.

(21) Appl. No.: 14/664,796

(22) Filed: Mar. 20, 2015

(65) Prior Publication Data
US 2015/0277481 A1  Oct. 1, 2015

(30) Foreign Application Priority Data

Mar. 27, 2014 (JP) ................. 2014-065685

(51) Int. Cl.
*G06F 1/12* (2006.01)
(52) U.S. Cl.
CPC ..................... *G06F 1/12* (2013.01)
(58) Field of Classification Search
CPC ..................... G06F 1/12; G06F 1/14
See application file for complete search history.

(56) References Cited

U.S. PATENT DOCUMENTS

| 7,366,937 | B2 * | 4/2008 | Rivoir | G06F 1/12 |
| | | | | 327/116 |
| 8,401,092 | B1 * | 3/2013 | Liu | H04L 7/0037 |
| | | | | 375/257 |
| 2008/0034265 | A1 * | 2/2008 | Kang | G01R 31/3193 |
| | | | | 714/736 |

FOREIGN PATENT DOCUMENTS

| JP | H10-13398 A | 1/1998 |
| JP | 2000-261419 A | 9/2000 |
| JP | 2006-14326 A | 1/2006 |

OTHER PUBLICATIONS

DDR Memory Interface IP, Synopsys, Inc., 2015., http://www.synopsys.com/IP/InterfaceIP/DDRn/Page/default.aspx/.
Japanese Office Action dated Jul. 11, 2017 issued in Japanese Patent Application No. 2014-065685 (with English translation).

* cited by examiner

*Primary Examiner* — Fahmida Rahman
(74) *Attorney, Agent, or Firm* — McDermott Will & Emery LLP (57) ABSTRACT

The present invention solves a problem that the phases of clocks obtained by frequency-dividing PLL clocks output from local PLL circuits cannot be made the same in a plurality of data transfer blocks. A local PLL circuit outputs a PLL clock obtained by multiplying a common external clock. A frequency divider outputs a feedback clock obtained by frequency-dividing the PLL clock to the local PLL circuit. An FIFO buffer temporarily holds data input from the outside. The FIFO buffer outputs the held data on the basis of a frequency-divided PLL clock. A clock generator generates a frequency-divided PLL clock obtained by frequency-dividing the PLL clock. The clock generator controls the phase of the frequency-divided PLL clock on the basis of a common start signal.

5 Claims, 13 Drawing Sheets

SEMICONDUCTOR DEVICE

CROSS-REFERENCE TO RELATED APPLICATIONS

The disclosure of Japanese Patent Application No. 2014-065685 filed on Mar. 27, 2014 including the specification, drawings and abstract is incorporated herein by reference in its entirety.

BACKGROUND

The present invention relates to a semiconductor device and, for example, relates to a semiconductor device having a plurality of data transfer blocks.

Conventionally, a DDR-PHY (Double Data Rate-PHYsical interface) as an interface between a memory controller and a DRAM (Dynamic Random Access Memory) is known (refer to, for example, non-patent literature 1).

The DDR-PHY converts parallel data from a memory controller to serial data, transmits the serial data to a DRAM, converts serial data received from the DRAM to parallel data, and transmits the parallel data to the memory controller.

In the DDR-PHY, there is a case that a clock skew becomes an issue. As a measure against the clock skew, for example, patent literature 1 describes a configuration that, at the time of transferring data between two circuit systems of different clocks, a signal latched by a clock A is latched again by a clock B.

RELATED ART LITERATURE

Patent Literature

Patent literature 1: Japanese Unexamined Patent Application Publication No. 2000-261419

Non-Patent Literature 1 http://www.synopsys.com/IP/InterfaceIP/DDRn/Pages/default.aspx

SUMMARY

There is a case that, to increase the flexibility of layout of DDR terminals, a DDR-PHY is divided into a plurality of data transfer blocks and the plurality of data transfer blocks are disposed so as to be dispersed. Such a case has a problem that, when the distance between the data transfer blocks increases, the tree length of a clock supplied to each of the data transfer blocks becomes longer and a clock jitter becomes larger. To reduce the clock jitter, it is effective to employ the configuration that each of the data transfer blocks has a local PLL circuit.

There is, however, a problem that the phases of clocks obtained by frequency-dividing PLL clocks output from the local PLL circuits cannot be made the same in the plurality of data transfer blocks.

The other problems and novel features will become apparent from the description of the specification and the appended drawings.

In a semiconductor device according to an embodiment of the present invention, a clock generator controls phases of frequency-divided PLL clocks on the basis of a start signal commonly input to a plurality of data transfer blocks.

According to an embodiment of the present invention, a plurality of data transfer blocks are provided with local PLLs and phases of clocks obtained by frequency-dividing PLL clocks output from the local PLLs can be made the same in the plurality of data transfer blocks.

DETAILED DESCRIPTION

Hereinbelow, embodiments of the present invention will be described with reference to the drawings.

First Embodiment

Figure 1:
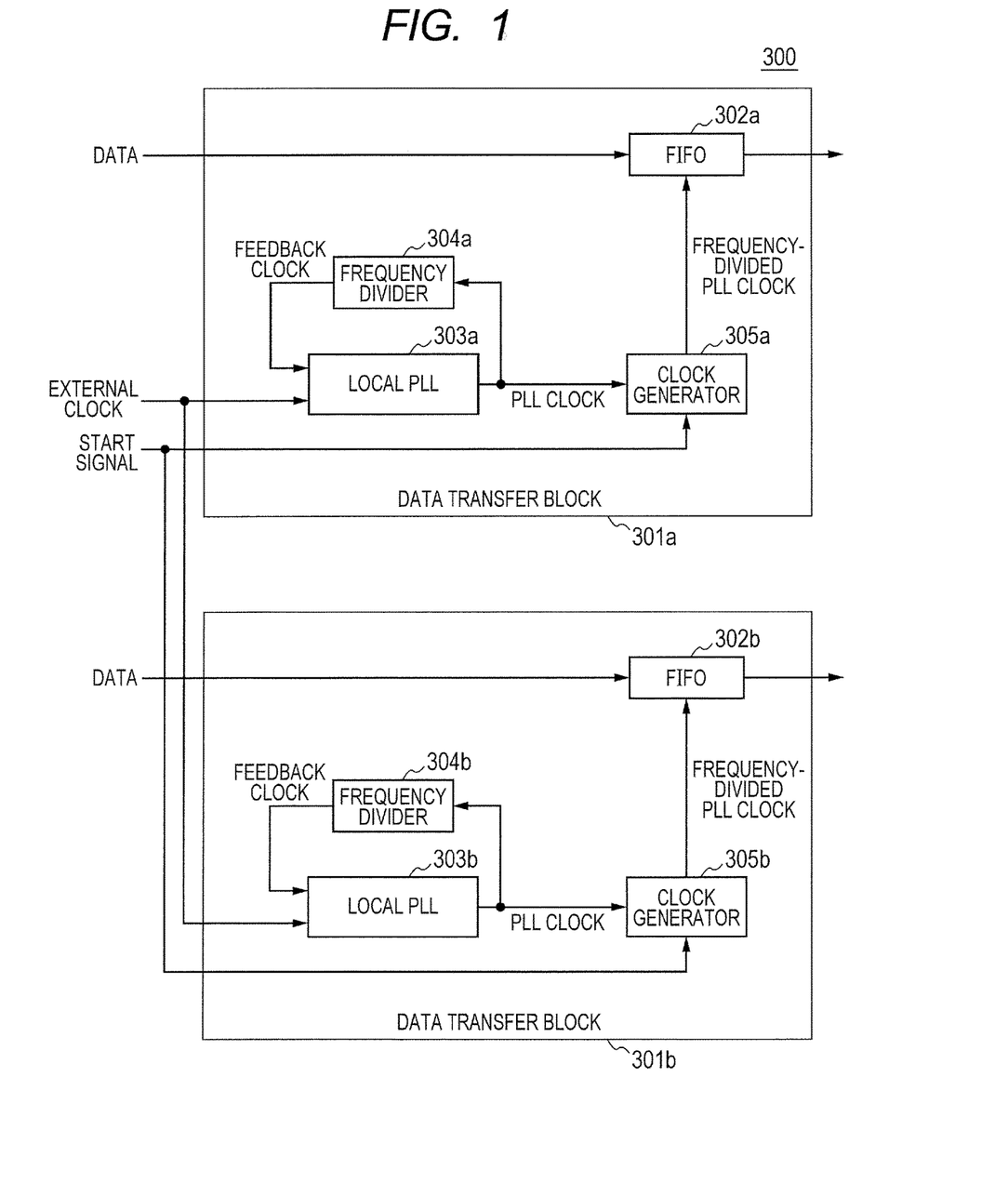
FIG. 1 is a diagram expressing the configuration of a semiconductor device according to a first embodiment of the present invention.

FIG. 1 is a diagram expressing the configuration of a semiconductor device according to a first embodiment of the present invention.

A semiconductor device 300 is obtained by forming integrated circuits on a single semiconductor chip.

The semiconductor device 300 has a plurality of data transfer blocks 301a and 301b. The two data transfer blocks 301a and 301b are disposed so as to be dispersed. For example, the data transfer block 301a is adjacently disposed along one of four sides of a semiconductor chip having a rectangular shape in plan view, and the data transfer block 301b is adjacently disposed along any of the other three sides including the opposed side in the semiconductor chip.

To the data transfer blocks 301a and 301b, a common external clock and a common start signal (also called a hint signal) are supplied.

The data transfer block 301a has a local PLL (Phase Locked Loop) circuit 303a, a frequency divider 304a, a clock generator 305a, and an FIFO (First In First Out) buffer 302a.

The local PLL circuit 303a outputs a PLL clock obtained by multiplying the common external clock.

The frequency divider 304a outputs a feedback clock obtained by frequency-dividing the PLL clock to the local PLL circuit 303a.

The FIFO buffer 302a temporarily holds data input from the outside. The FIFO buffer 302a outputs the held data on the basis of the frequency-divided PLL clock.

The clock generator 305a generates a frequency-divided PLL clock obtained by frequency-dividing the PLL clock. The clock generator 305a controls the phase of the frequency-divided PLL clock on the basis of the common start signal.

The configuration of the data transfer block 301b is similar to that of the data transfer block 301a.

As described above, according to the embodiment, the phase of the frequency-divided PLL clock is controlled on the basis of the common start signal, so that the phase of the frequency-divided PLL clock in the data transfer block 301a and that in the data transfer block 301b can be made the same.

Second Embodiment

Figure 2:
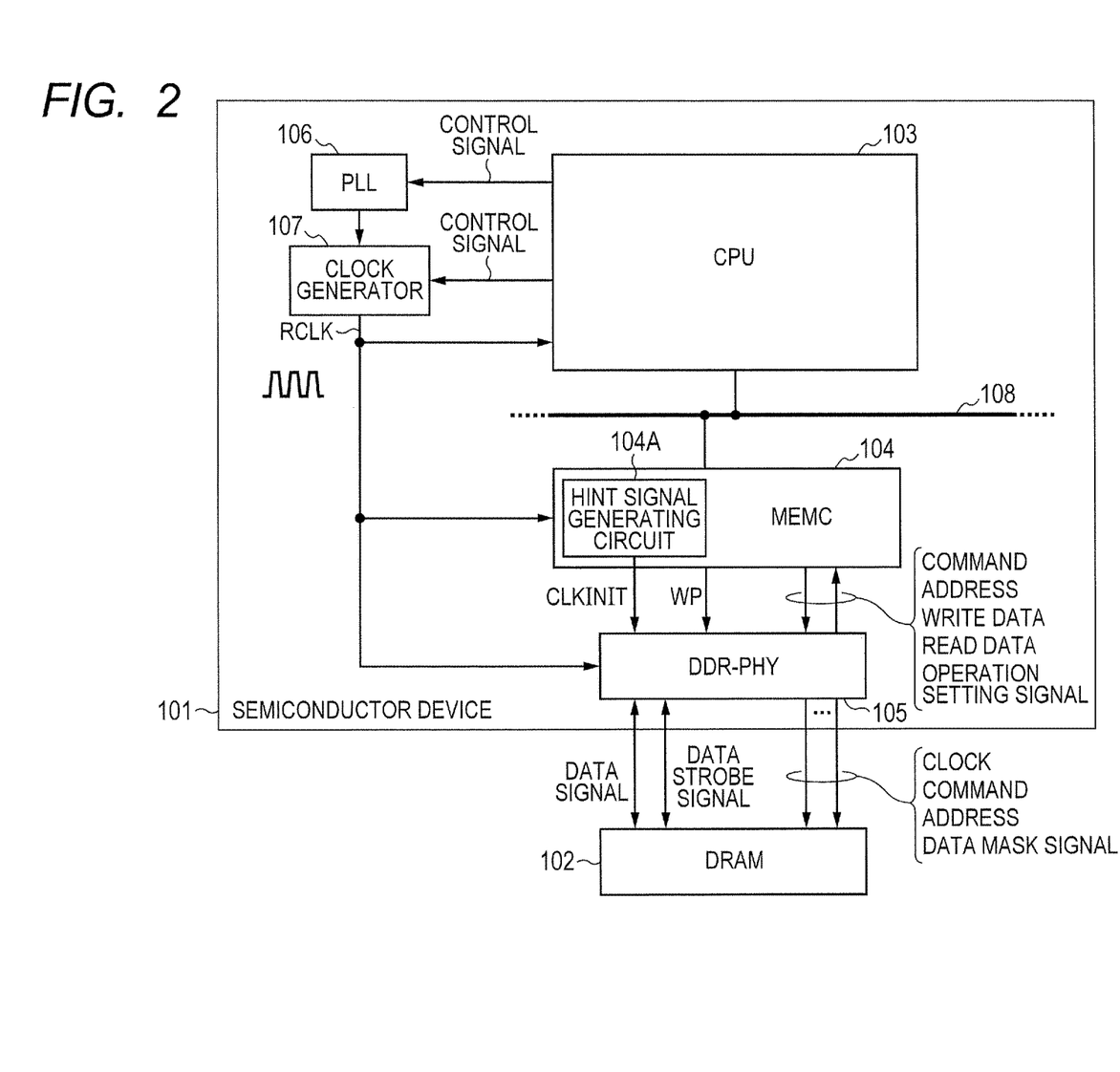
FIG. 2 is a diagram expressing the configuration of a semiconductor device according to a second embodiment of the present invention.

FIG. 2 is a diagram expressing the configuration of a semiconductor device according to a second embodiment of the present invention.

A semiconductor device 101 is obtained by forming integrated circuits on a single semiconductor chip. A DRAM (Dynamic Random Access Memory) 102 illustrated in FIG. 2 is configured by a semiconductor chip different from that of the semiconductor device 101.

The semiconductor device 101 is, for example, an SoC (System on Chip) as a component of a microcomputer, a baseband IC provided in a portable device, or an application processor.

As illustrated in FIG. 2, the semiconductor device 101 has a CPU (Central Processing Unit) 103, a PLL circuit 106, a clock generator 107, an MEMC (Memory Controller) 104, and a DDR-PHY 105.

The DDR-PHY 105 is coupled to the DRAM 102 on the outside. The DDR-PHY 105 is a physical interface for accessing the DRAM 102 at a double rate. The DDR-PHY 105 outputs a clock, a command, an address, and a data mask signal to the DRAM 102. Further, the DDR-PHY 105 transmits/receives a data signal and a data strobe signal to/from the DRAM 102.

The DDR-PHY 105 includes an interface (hereinbelow, called a read interface) for reading data from the DRAM 102 and an interface (hereinbelow, called a write interface) for writing data to the DRAM 102. The parts configuring the DDR-PHY 105 are disposed so as to be dispersed to two different sides of the semiconductor chip.

The MEMC 104 is coupled to the DDR-PHY 105 and is also coupled to the CPU 103 via a bus 108. The MEMC 104 controls the operation of the DDR-PHY 105 in accordance with an instruction of the CPU 103. The MEMC 104 outputs a command, an address, write data, and a signal for operation setting toward the DDR-PHY 015, and receives read data of the DDR-PHY 105.

The PLL circuit 106 generates a reference clock. The clock generator 107 generates a reference clock RCLK on the basis of the reference clock output from the PLL circuit 106. The PLL circuit 106 and the clock generator 107 are controlled by a control signal from the CPU 103. The generated reference clock RCLK is supplied to each of the parts of the semiconductor device 101.

The MEMC 104 includes a hint signal generating circuit 104A. At the time of power-on reset of the semiconductor device 101, the hint signal generating circuit 104 changes the level of a hint signal CLKINIT to the low level synchronously with the reference clock RCLK.

The MEMC 104 generates a write pointer WP on the basis of the hint signal CLKINIT and outputs it to the DDR-PHY 105. Concretely, the MEMC 104 starts a change from the initial value of the write pointer WP at the timing when the hint signal CLKINIT changes to the low level. The MEMC 104 changes the value of the write pointer WP at the timing when the reference clock RCLK rises.

Reference Example 1

Figure 3:
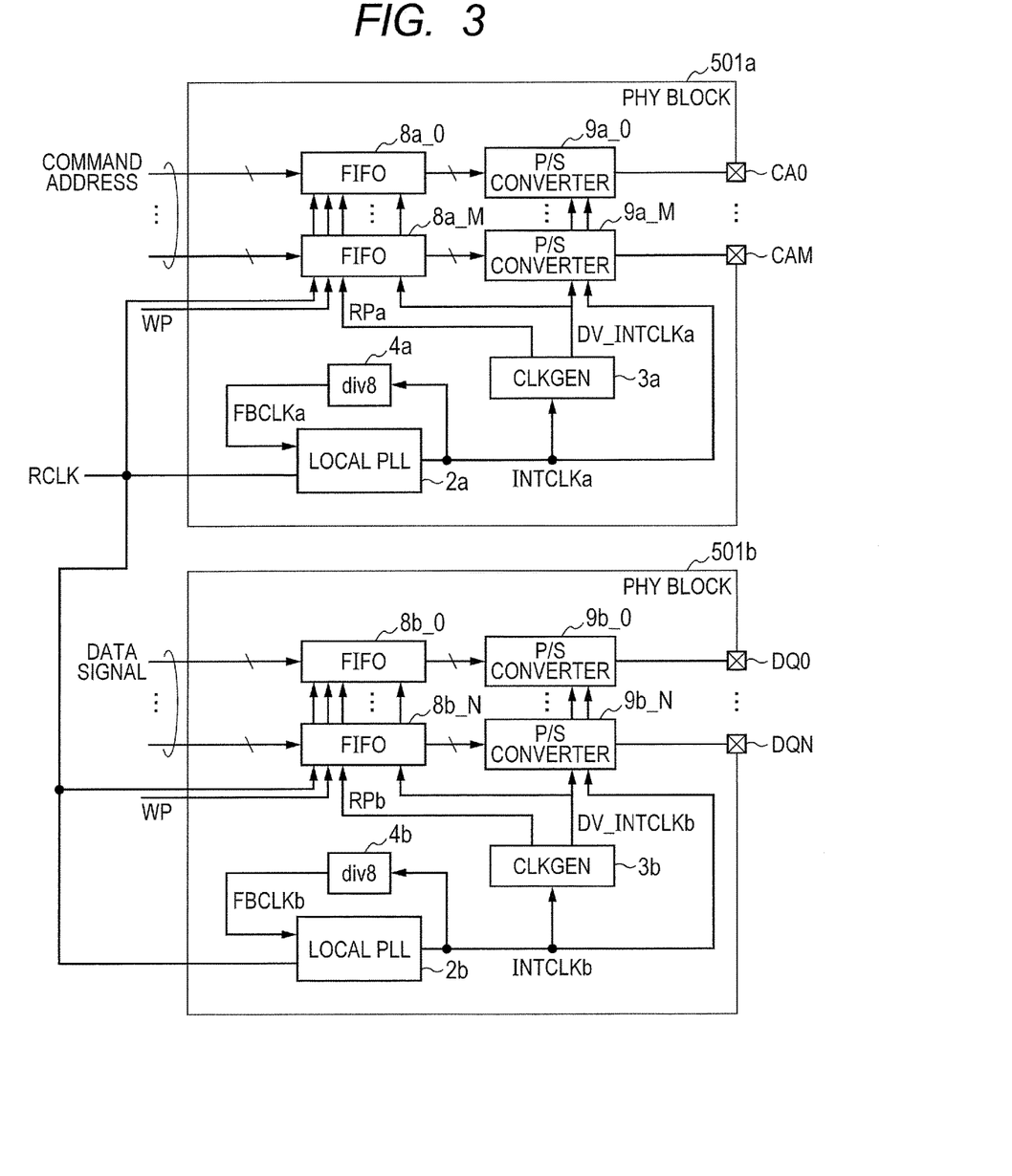
FIG. 3 is a diagram expressing the configuration of a write interface of reference example 1 included in a DDR-PHY.

FIG. 3 is a diagram expressing the configuration of a write interface of reference example 1 included in the DDR-PHY 105.

The write interface has a PHY block 501a as a data transfer block outputting a write command and an address to the DRAM 102, and a PHY block 501b as a data transfer block outputting a data signal to the DRAM 102.

The two PHY blocks 501a and 501b are disposed so as to be dispersed. For example, the PHY block 501a is adjacently disposed along one of four sides of a semiconductor chip having a rectangular shape in plan view, and the PHY block 501b is adjacently disposed along any of the other three sides including the opposed side in the semiconductor chip.

In the following description, it is assumed that the frequency of the reference clock RCLK is 267 MHz.

The PHY block 501a has FIFO buffers $8a\_0$ to $8a\_M$, P/S converters $9a\_0$ to $9a\_M$, a local PLL circuit 2a, a frequency divider (div8) 4a, and a clock generator (CLKGEN) 3a.

The local PLL circuit 2a receives the reference clock RCLK and a feedback clock FBCLKa and outputs a PLL clock INTCLKa (2133 MHz) synchronized with the phase of the reference clock RCLK and having a frequency obtained by multiplying the frequency of the reference clock RCLK by eight.

The frequency divider 4a divides the PLL clock INTCLKa by eight and outputs the feedback clock FBCLKa (267 MHz).

The clock generator 3a generates a frequency-divided PLL clock DV_INTCLKa obtained by dividing the PLL clock INTCLKa by eight and outputs it to the FIFO buffers $8a\_0$ to $8a\_M$. The clock generator 3a generates a read pointer RPa in accordance with the PLL clock INTCLKa and outputs it to the FIFO buffers $8a\_0$ to $8a\_M$.

The FIFO buffer $8a\_i$ (i=0 to M) holds data (data expressing a command or address) transmitted from the MEMC 104 in a first-in first-out manner. The FIFO buffer $8a\_i$ supplies (writes) data transmitted from the MEMC 104 to a location designated by the write pointer WP transmitted from the MEMC 104. The FIFO buffer $8a\_i$ also outputs (reads) data in a location designated by a read pointer RPa transmitted from the clock generator 3a. To the FIFO buffer $8a\_i$ (i=0 to M), the reference clock RCLK is supplied.

The P/S converter $9a\_i$ (i=0 to M) converts parallel data output from the FIFO buffer $8a\_i$ to serial data and outputs the serial data to an output terminal (command address output terminal) CAi.

The configuration of the PHY block 501b is similar to that of the PHY block 501a.

To the PHY block 501b, however, not a command or address but a data signal is transmitted from the MEMC 104. Consequently, an FIFO buffer $8b\_i$ (i=0 to N) holds data (data signal) transmitted from the MEMC 104 in a first-in first-out manner. The FIFO buffer $8b\_i$ inputs (writes) data transmitted from the MEMC 104 to a location designated by the write pointer WP transmitted from the MEMC 104. The FIFO buffer $8b\_i$ outputs (reads) data in a location designated by a read pointer RPb transmitted from a clock generator 3b.

A P/S converter 9b_i (i=0 to N) converts parallel data output from the FIFO buffer 8b_i to serial data and outputs the serial data to an output terminal DQi (data signal output terminal).

First Problem of Reference Example 1

Figure 4:
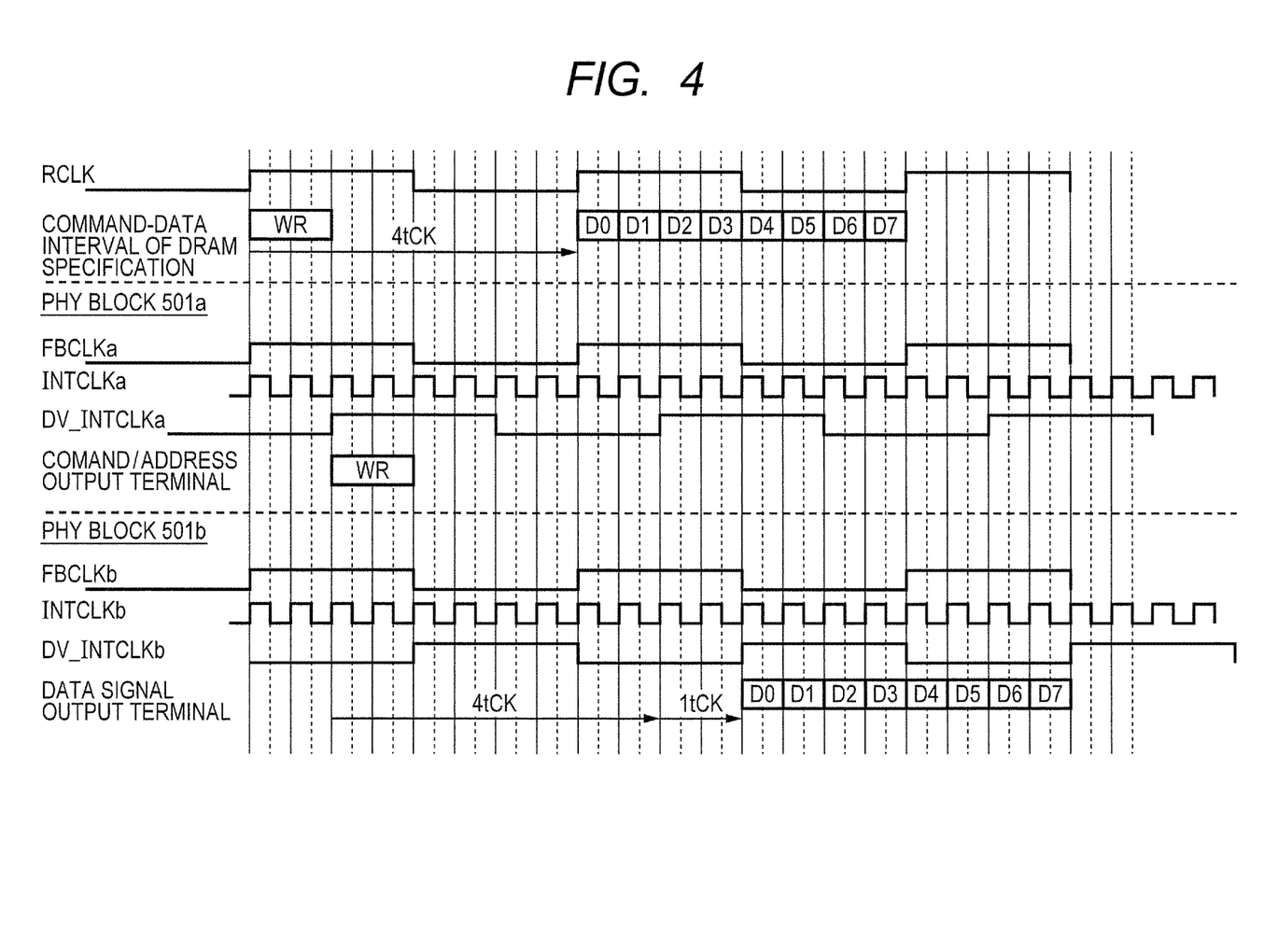
FIG. 4 is a diagram for explaining a first problem of the reference example 1.

FIG. 4 is a diagram for explaining a first problem of the reference example 1.

It is assumed as illustrated in FIG. 4 that the command-data interval required by the DRAM standard is 4tCK. Specifically, it is assumed that, in the case where a write command WR and data signals D0 to D7 to be transmitted from the DDR-PHY 105 to the DRAM 102 are sent, the transmission timing of the write command WR to the DRAM 102 and the transmission timing of the data signal D0 at the head to the DRAM 102 are required to be deviated only by 4tCK. 1tCK expresses time of one cycle of the DRAM 102.

In the PHY block 501a, on the basis of the rise of the frequency-divided PLL clock DV_INTCLKa, the write command WR is output from the FIFO buffer 8a, and the write command WR is output from an output terminal CA via the P/S converter 9a.

On the other hand, in the PHY block 501b, on the basis of the rise of the frequency-divided PLL clock DV_INTCLKb, the data signal D0 at the head is output from the FIFO buffer 8b, and the data signal D0 is output from an output terminal DQ via the P/S converter 9b.

The clock generator 3a of the PHY block 501a and the clock generator 3b of the PHY block 501b select clock pulses of high frequency at different timings and generate the frequency-divided PLL clocks DV_INTCLKa and DV_INTCLKb, respectively, so that the phases of the frequency-divided clocks are different. Consequently, in the example of FIG. 4, the transmission timing of the write command WR from the DDR-PHY 105 to the DRAM 102 and the transmission timing of the data signal D0 at the head to the DRAM 102 are deviated only by 4tCK+1tCK, so that the command-data interval "4tCK" required by the DRAM standard cannot be achieved.

Second Problem of Reference Example 1

Figure 5:
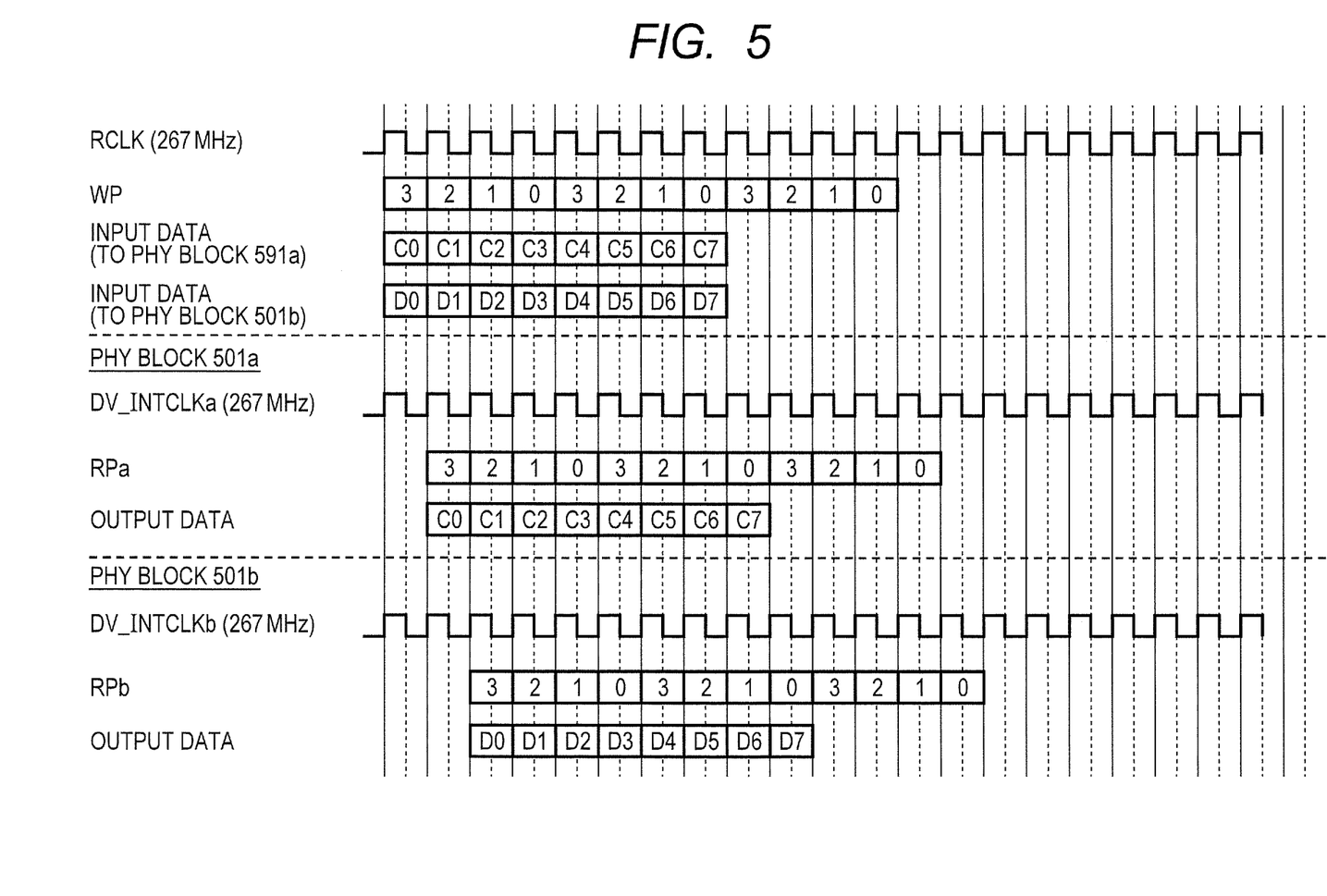
FIG. 5 is a diagram for explaining a second problem of the reference example 1.

FIG. 5 is a diagram for explaining a second problem of the reference example 1.

As illustrated in FIG. 5, data C0 to C7 transmitted from the MEMC 104 is supplied to a location designated by the write pointer WP in an FIFO buffer 8a. Data D0 to D7 transmitted from the MEMC 104 is supplied to a location designated by the write pointer WP in an FIFO buffer 8b.

After that, in the PHY block 501a, the data C0 to C7 is output from the location designated by the read pointer RPa in the FIFO buffer 8a. In the PHY block 501b, the data D0 to D7 is output from the location designated by the read pointer RPb in the FIFO buffer 8b.

Since the clock generator 3a of the PHY block 501a and the clock generator 3b of the PHY block 501b generate the read pointers RPa and RPb independently of each other, the timings at which the pointers are updated are different from each other. Consequently, in the example of FIG. 5, the timing of data C0 to C7 and the timing of data D0 to D7 transmitted from the DDR-PHY 105 to the DRAM 102 are different from each other. As a result, the command-data interval required by the DRAM standard cannot be achieved.

Configuration of Embodiment

Figure 6:
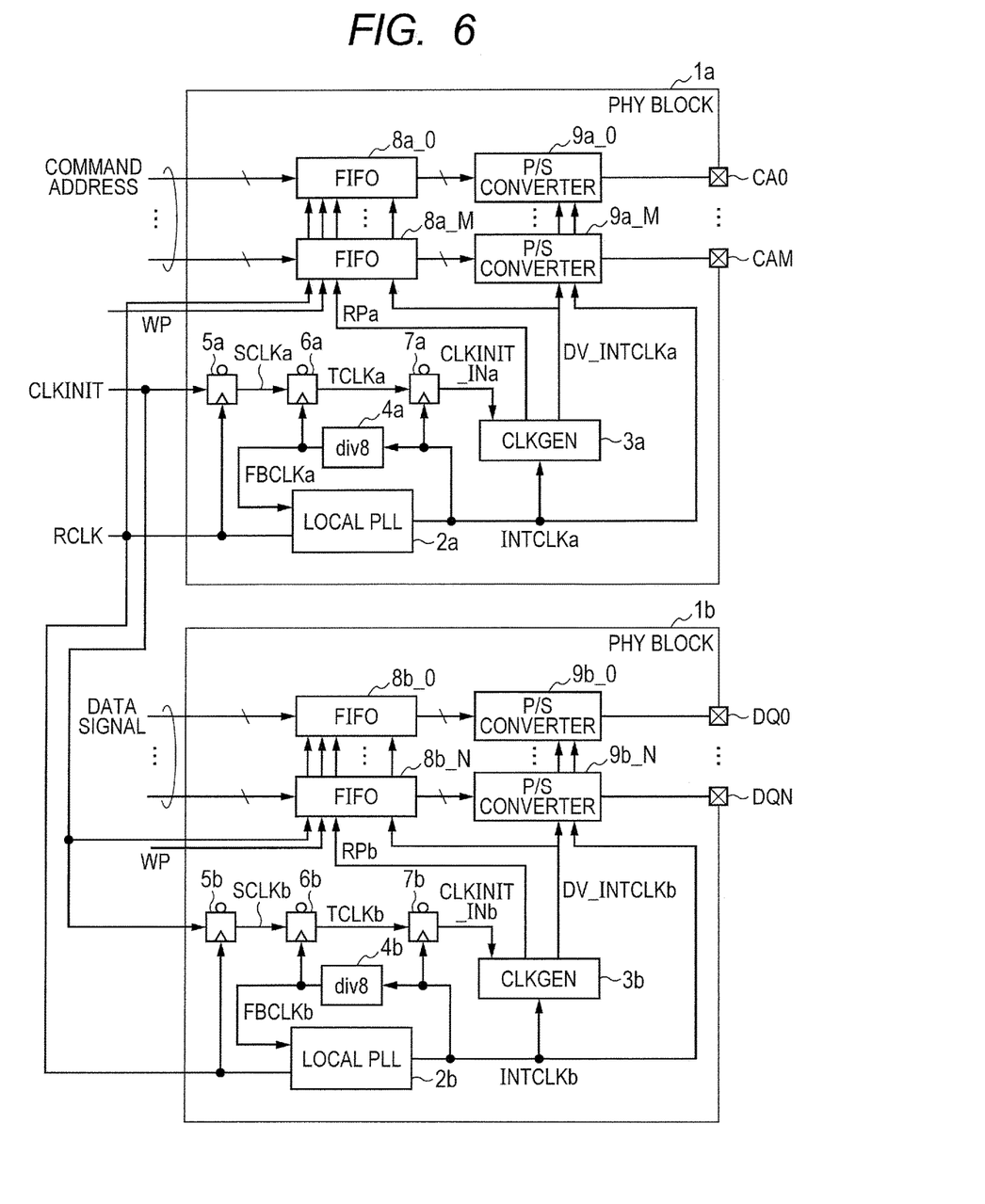
FIG. 6 is a diagram expressing the configuration of a write interface included in a DDR-PHY in a second embodiment.

FIG. 6 is a diagram expressing the configuration of a write interface included in the DDR-PHY 105 in a second embodiment.

The write interface has a PHY block 1a outputting a write command and an address to the DRAM 102, and a PHY block 1b outputting a data signal to the DRAM 102.

The two PHY blocks 1a and 1b are disposed so as to be dispersed. For example, the PHY block 1a is adjacently disposed along one of four sides of a semiconductor chip having a rectangular shape in plan view, and the PHY block 1b is adjacently disposed along any of the other three sides including the opposed side in the semiconductor chip.

The PHY block 1a is different from the PHY block 501a of FIG. 3 with respect to the points that the PHY block 1a has flip flops 5a, 6a, and 7a, and the clock generator 3a receives a clock CLKINIT_INa output from the flip flop 7a.

The flip flop 5a takes (latches) the hint signal CLKINIT of the low level at the rise timing of the reference clock RCLK and outputs a clock SCLKa.

The flip flop 6a takes (latches) the clock SCLKa of the low level at the rise timing of the feedback clock FBCLKa and outputs a clock TCLKa.

The flip flop 7a takes (latches) the clock TCLKa of the low level at the rise timing of the PLL clock INTCLKa and outputs a clock CLKINIT_INa.

In such a manner, the hint signal CLKINIT is synchronously transferred in the order of a flip flop 5a synchronized with the reference clock RCLK, a flip flop 6a synchronized with the feedback clock FBCLKa, and a flip flop 7a synchronized with the PLL clock INTCLKa.

By lowering the frequency of the feedback clock FBCLKa and the frequency of the reference clock RCLK, even when the jitter of the reference clock RCLK becomes large, the hint signal CLKINIT synchronized with the reference clock RCLK can be synchronously transferred to the flip flop 6a synchronized with the feedback clock FBCLKa.

The configuration of the PHY block 1b is similar to that of the PHY block 1a.

Figure 7:
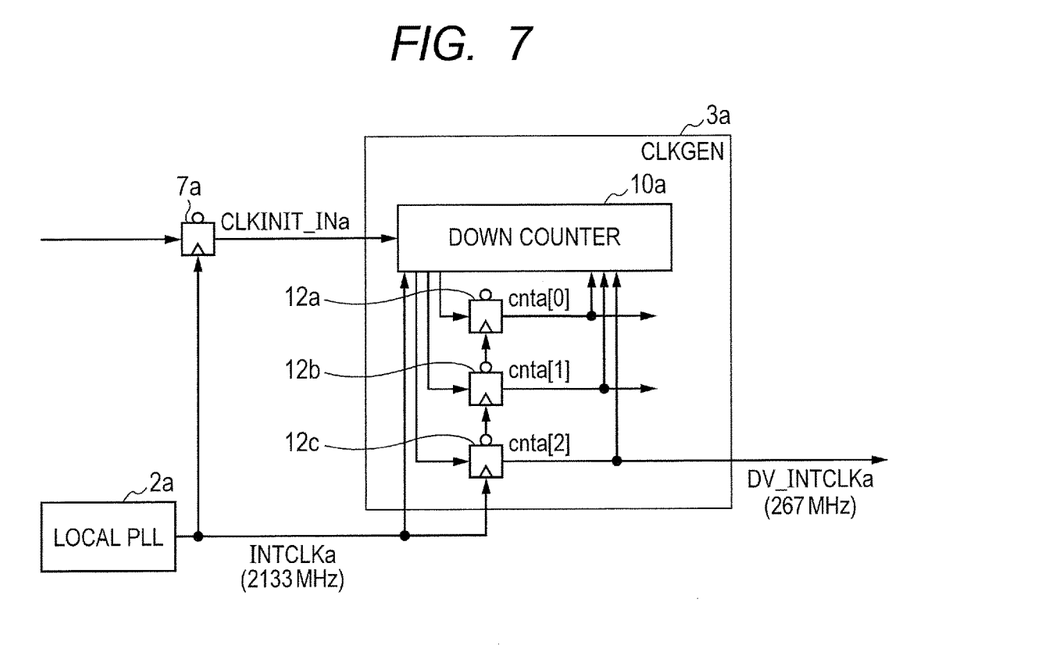
FIG. 7 is a diagram expressing the configuration of a clock generator in the second embodiment.

FIG. 7 is a diagram expressing the configuration of the clock generator (CLKGEN) 3a in the second embodiment.

The clock generator 3a has a down counter 10a and flip flops 12a, 12b, and 12c.

When the clock CLKINIT_INa is at the low level, the down counter 10a decreases a count value at the rise timing of the PLL clock INTCLKa (2133 MHz). The initial value of the down counter 10a is set according to the timings of the clock CLKINIT_INa and the frequency-divided PLL clock DV_INTCLKa.

The flip flop 12a takes (latches) the zeroth bit (LSB: Least Significant Bit) of the count value of the down counter 10a at the rise timing of the PLL clock INTCLKa and outputs a count signal cnta[0].

The flip flop 12b takes (latches) the first bit (the bit higher than the LSB by one) of the count value of the down counter 10a at the rise timing of the PLL clock INTCLKa and outputs a count signal cnta[1].

The flip flop 12c takes (latches) the second bit (the bit higher than the LSB by two) of the count value of the down counter 10a at the rise timing of the PLL clock INTCLKa and outputs a count signal cnta[2]. The signal output from the flip flop 12c becomes the frequency-divided PLL clock DV_INTCLKa (267 MHz).

Figure 8:
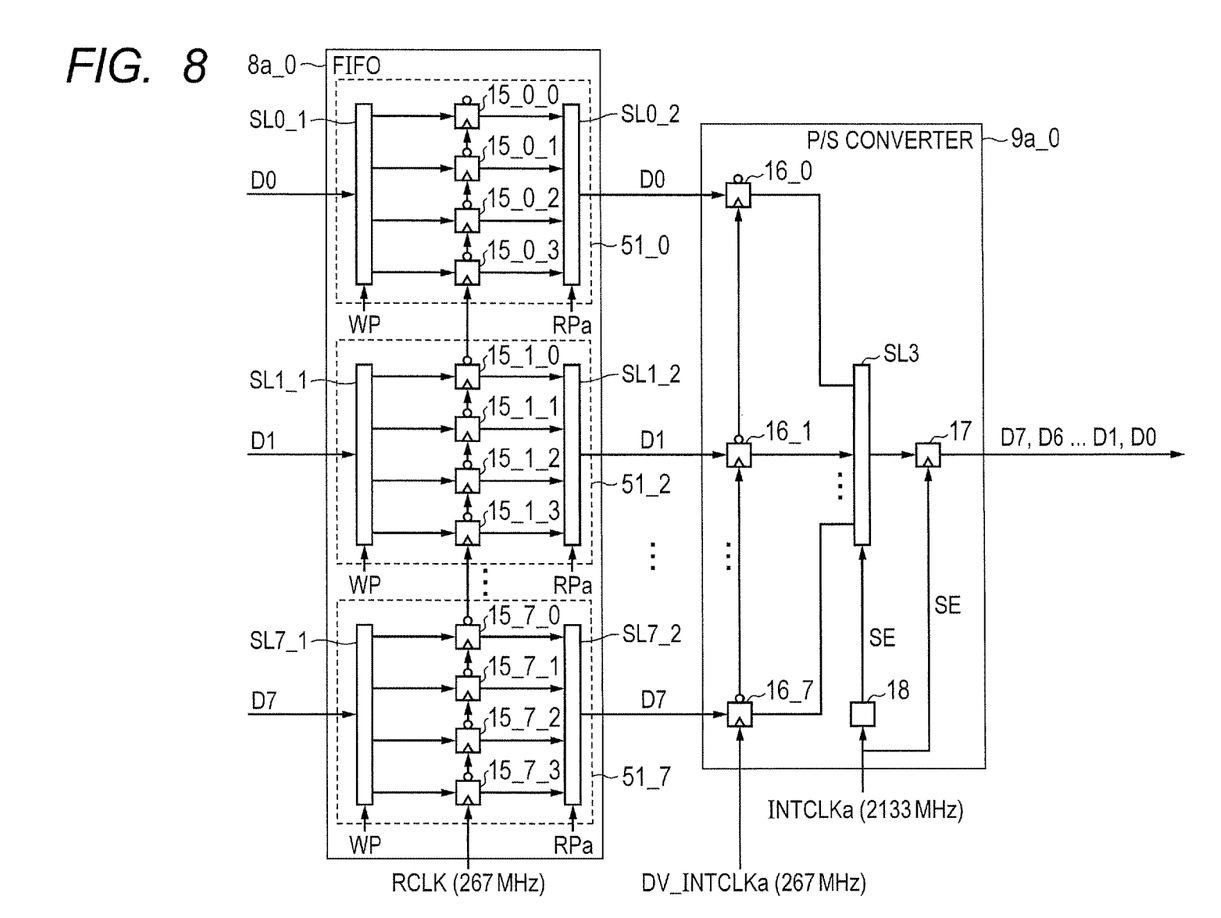
FIG. 8 is a diagram expressing the configuration of an FIFO buffer and a P/S converter.

FIG. 8 is a diagram expressing the configuration of the FIFO buffer 8a_0 and the P/S converter 9a_0.

To the FIFO buffer 8a_0, the parallel data D0 to D7 is supplied.

The FIFO buffer 8a_0 has zeroth to seventh holding units 51_0 to 51_7.

The i-th holding unit 51_i (i=0 to 7) includes a selector SLi_1 receiving input data Di, flip flops 15_i_0 to 15_i_3 receiving outputs of the selector SLi_1, and a selector SLi_2 receiving outputs of the flip flops 15_i_0 to 15_i_3.

The selector SLi_1 outputs the input data Di to any of the flip flops 15_i_0 to 15_i_3 in accordance with the write pointer WP. When the write pointer WP is "0", the selector SLi_1 outputs the input data Di to the flip flop 15_i_0. When the write pointer WP is "1", the selector SLi_1 outputs the input data Di to the flip flop 15_i_1. When the write pointer WP is "2", the selector SLi_1 outputs the input data Di to the flip flop 15_i_2. When the write pointer WP is "3", the selector SLi_1 outputs the input data Di to the flip flop 15_i_3.

The flip flop 15_i_j (j=0 to 3) takes (latches) data output from the selector SLi_1 at the rise timing of the reference clock RCLK and outputs the data to the selector SLi_2.

The selector SLi_2 selects any of the outputs of the flip flops 15_i_0 to 15_i_3 in accordance with the read pointer RPa and outputs the selected output to the P/S converter 9a_0.

When the read pointer RPa is "0", the selector SLi_2 selects the output of the flip flop 15_i_0 and outputs it to the P/S converter 9a_0. When the read pointer RPa is "1", the selector SLi_2 selects the output of the flip flop 15_i_1 and outputs it to the P/S converter 9a_0. When the read pointer RPa is "2", the selector SLi_2 selects the output of the flip flop 15_i_2 and outputs it to the P/S converter 9a_0. When the read pointer RPa is "3", the selector SLi_3 selects the output of the flip flop 15_i_3 and outputs it to the P/S converter 9a_0.

The P/S converter 9a_0 has flip flops 16_0 to 16_7, a selection signal generator 18, a selector SL3, and a flip flop 17.

The flip flop 16_i (i=0 to 7) takes (latches) data output from the selector SLi_2 at the rise timing of the frequency-divided PLL clock DV_INTCLKa output from the clock generator 3a and outputs the data to the selector SL3.

The selection signal generator 18 generates a selection signal SE expressing an output to be selected from outputs of the flip flops 16_0 to 16_7 and outputs it to the selector SL3.

The selection signal generator 18 generates the selection signal SE whose selection is switched in the order of the flip flops 16_0, 16_1, . . . , and 16_7 at the timing of the PLL clock INTCLKa.

The selector SL3 outputs any of the outputs of the flip flops 16_0 to 16_7 in accordance with the selection signal SE.

The flip flop 17 takes (latches) the output of the selector SL3 at the rise timing of the PLL clock INTCLKa and outputs it to an output terminal CA0. Synchronously with the PLL clock INTCLKa, data is output from the flip flop 17 in order of D0, D1, . . . , and D7.

Figure 9:
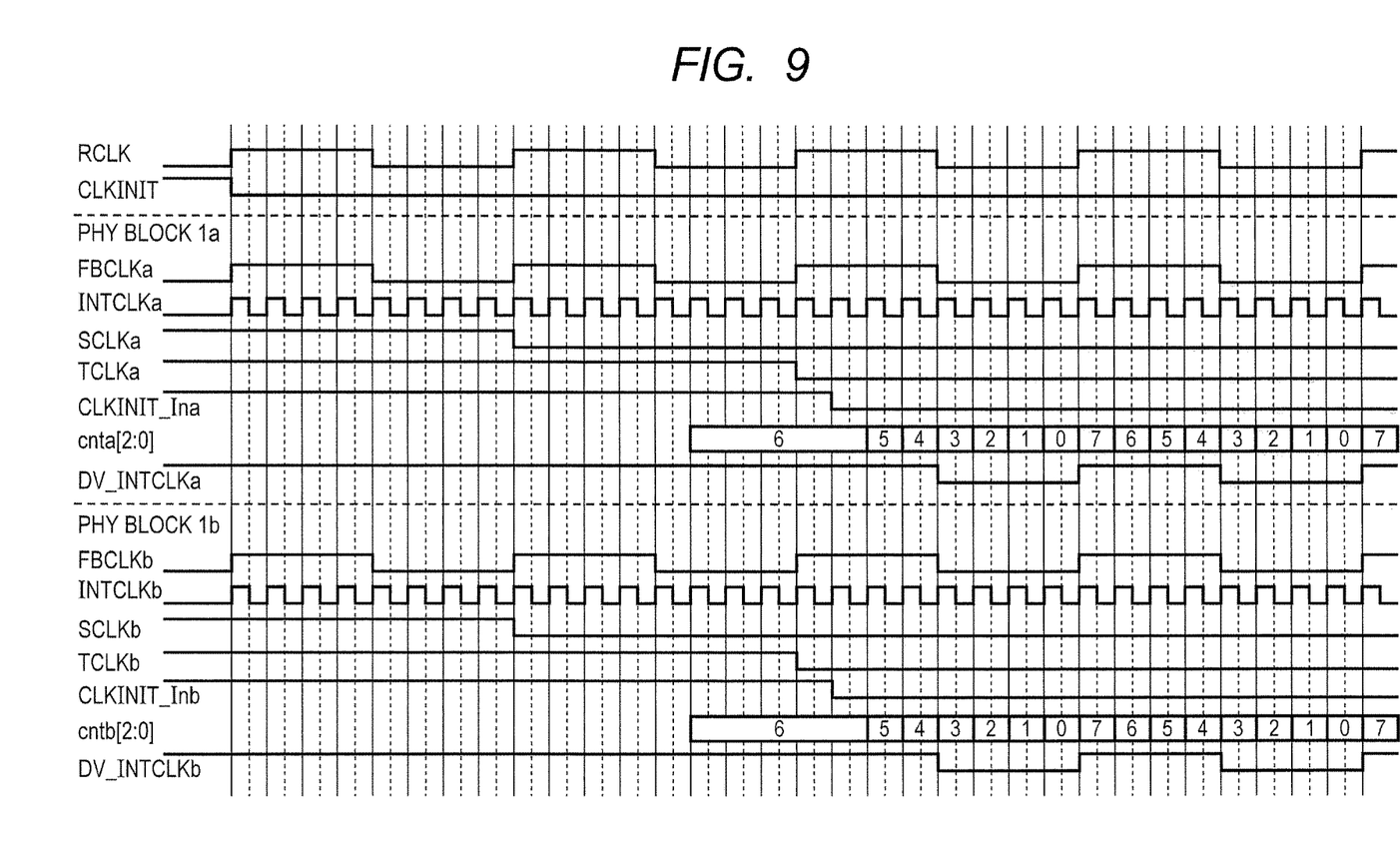
FIG. 9 is a timing chart of the second embodiment.

FIG. 9 is a timing chart of the second embodiment.

At the time of power-on reset, the hint signal generating circuit 104A in the MEMC 104 decreases the hint signal CLKINIT to the low level at the rise timing of the reference clock RCLK.

In the PHY block 1a, the levels of the internal signals change as follows.

The local PLL circuit 2a outputs a PLL clock INTCLKa (2133 MHz) synchronized with the phase of the reference clock RCLK and having a frequency obtained by multiplying the frequency of the reference clock RCLK by eight.

The frequency divider 4a divides the PLL clock INTCLKa by eight and outputs the feedback clock FBCLKa (267 MHz).

The flip flop 5a takes (latches) the hint signal CLKINIT of the low level at the rise timing of the reference clock RCLK and outputs the clock SCLKa.

The flip flop 6a takes (latches) the clock SCLKa of the low level at the rise timing of the feedback clock FBCLKa and outputs the clock TCLKa.

The flip flop 7a takes (latches) the clock TCLKa of the low level at the rise timing of the PLL clock INTCLKa and outputs the clock CLKINIT_INa.

After the clock CLKINIT_Ina changes to the low level, the clock generator 3a decreases a count signal cnta[0:2] of three bits from the initial value "6" by one at each rise timing of the PLL clock INTCLKa.

Since the frequency-divided PLL clock DV_INTCLKa (267 MHz) corresponds to the count signal cnta[2], the timing when the level of the frequency-divided PLL clock DV_INTCLKa changes becomes the same as the timing when the level of the feedback clock FBCLKa and the reference clock RCLK changes.

Also in the PHY block 1b, like in the PHY block 1a, the levels of the internal signals change.

Since the frequency-divided PLL clock DV_INTCLKb (267 MHz) output from the clock generator 3b corresponds to the count signal cntb[2], the timing when the level of the frequency-divided PLL clock DV_INTCLKb changes becomes the same as the timing when the level of the feedback clock FBCLKb and the reference clock RCLK changes.

As described above, each of the phase of the frequency-divided PLL clock DV_INTCLKa generated by the PHY block 1a and the phase of the frequency-divided PLL clock DV_INTCLKb generated by the PHY block 1b becomes the same as the phase of the reference clock RCLK.

Therefore, the timing when data is output from the FIFO buffer 8a in the PHY block 1a and the timing when data is output from the FIFO buffer 8b in the PHY block 1b become the same. Consequently, the problem as described with reference to FIG. 4 that the command-data interval required by the DRAM standard becomes unachievable can be avoided.

Reference Example 2

Figure 10:
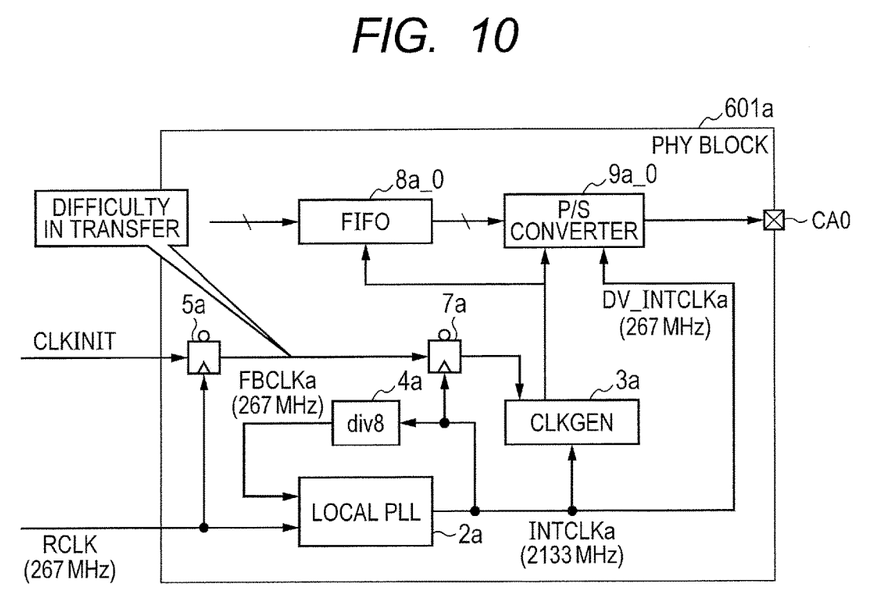
FIG. 10 is a diagram expressing the configuration of a PHY block of reference example 2.

FIG. 10 is a diagram expressing the configuration of the PHY block 601a of reference example 2.

In FIG. 10, with respect to the FIFO buffers and P/S converters, only the FIFO buffer 8a_0 and the P/S converter 9a_0 are drawn and the others are omitted.

The PHY block 601a of the reference example 2 does not include the flip flop 6a which is included in the PHY block 1a of FIG. 6.

Figure 11:
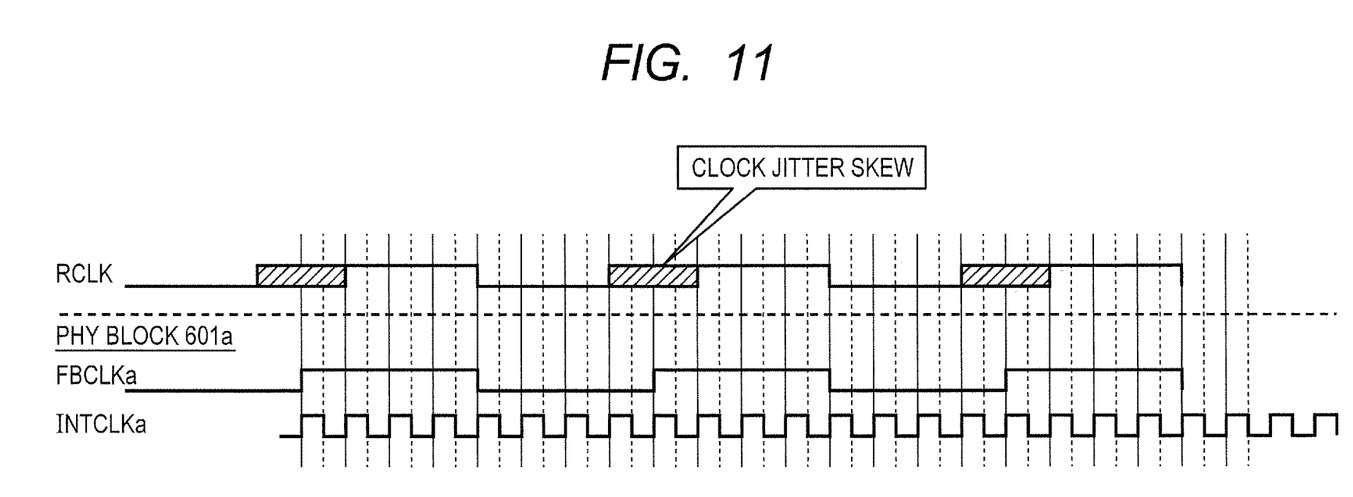
FIG. 11 is a diagram for explaining a problem of the PHY block of the reference example 2.

When the flip flop 6a operating at the feedback clock FBCLKa is omitted, the hint signal CLKINIT is transferred from the flip flop 5a synchronized with the reference clock RCLK to the flip flop 7a synchronized with the PLL clock INTCLKa. As a result, as illustrated in FIG. 11, due to the influence of a jitter of the reference clock RCLK and a skew between the reference clock RCLK and the PLL clock INTCLKa, it becomes difficult to perform the synchronous transfer.

On the other hand, in the PHY block 1a of FIG. 6, since the feedback clock FBCLKa is a clock obtained by frequency-dividing the PLL clock INTCLKa, synchronous transfer can be realized between the flip flop 6a synchronized with the feedback clock FBCLKa and the flip flop 7a synchronized with the PLL clock INTCLKa.

Reference Example 3

Figure 12:
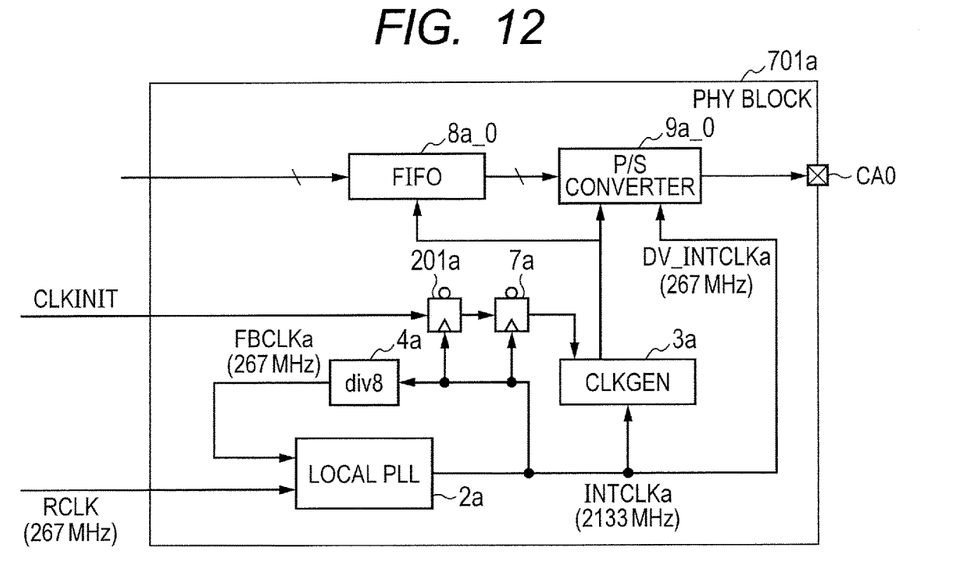
FIG. 12 is a diagram expressing the configuration of a PHY block of reference example 3.

FIG. 12 is a diagram expressing the configuration of a PHY block 701a of reference example 3.

In FIG. 12, with respect to the FIFO buffers and P/S converters, only the FIFO buffer 8a_0 and the P/S converter 9a_0 are drawn and the others are omitted.

The PHY block 701a of the reference example 3 does not include the flip flops 5a and 6a which are included in the PHY block 1a of FIG. 6 but, instead, includes a flip flop 201a synchronized with the PLL clock INTCLKa.

In the reference example 3, the hint signal CLKINIT is asynchronously transferred to the flip flop 201a. By the asynchronous transfer, a timing deviation may occur between the PHY block 701a and another PHY block 701b.

Since the clock INTCLKa with which the flip flop 201a on the reception side of the asynchronous transfer synchronizes is high-speed, there is the possibility that a metastable state is not converged.

Third Embodiment

Figure 13:
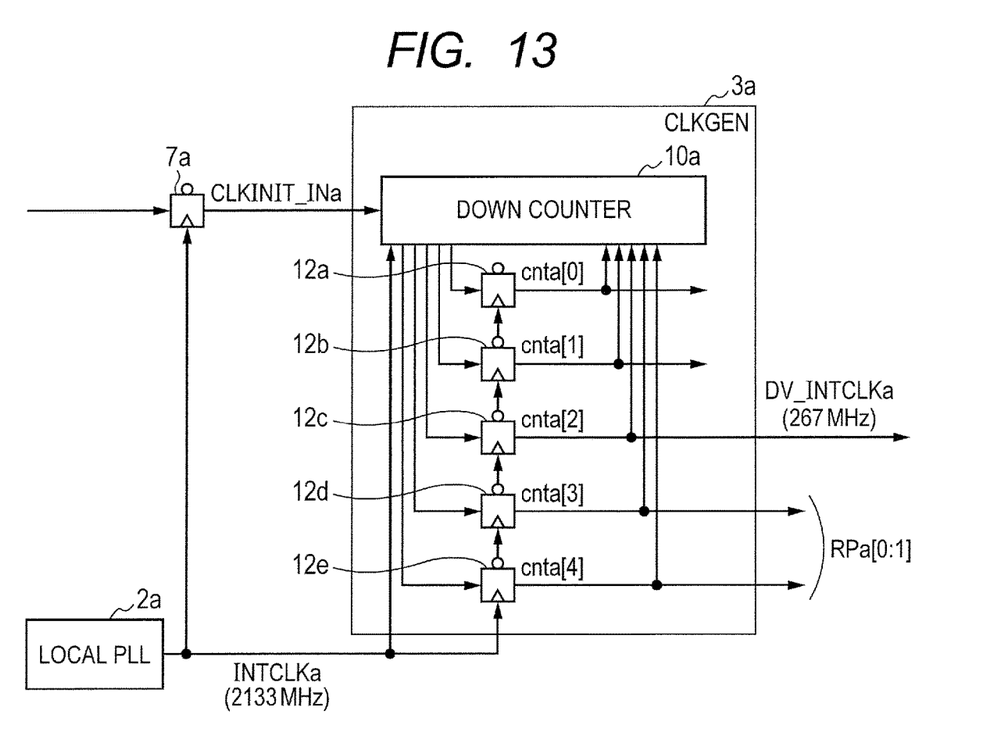
FIG. 13 is a diagram expressing the configuration of a clock generator of a third embodiment.

FIG. 13 is a diagram expressing the configuration of a clock generator (CLKGEN) 3a of a third embodiment.

The clock generator 3a has the down counter 10a and flip flops 12a, 12b, 12c, 12d, and 12e.

Since the down counter 10a and the flip flops 12a, 12b, and 12c are the same as those included in the clock generator 3a of the second embodiment, their description will not be repeated.

The flip flop 12d takes (latches) the third bit (the bit higher than the LSB by three) of the count value of the down counter 10a at the rise timing of the PLL clock INTCLKa and outputs a count signal cnta[3].

The flip flop 12e takes (latches) the fourth bit (the bit higher than the LSB by four) of the count value of the down counter 10a at the rise timing of the PLL clock INTCLKa and outputs a count signal cnta[4].

The signal output from the flip flop 12d becomes the zeroth bit (LSB) RPa[0] of the read pointer RPa, and the signal output from the flip flop 12e becomes a first bit (the bit higher than the LSB by one) RPa[1] of the read pointer RPa.

Figure 14:
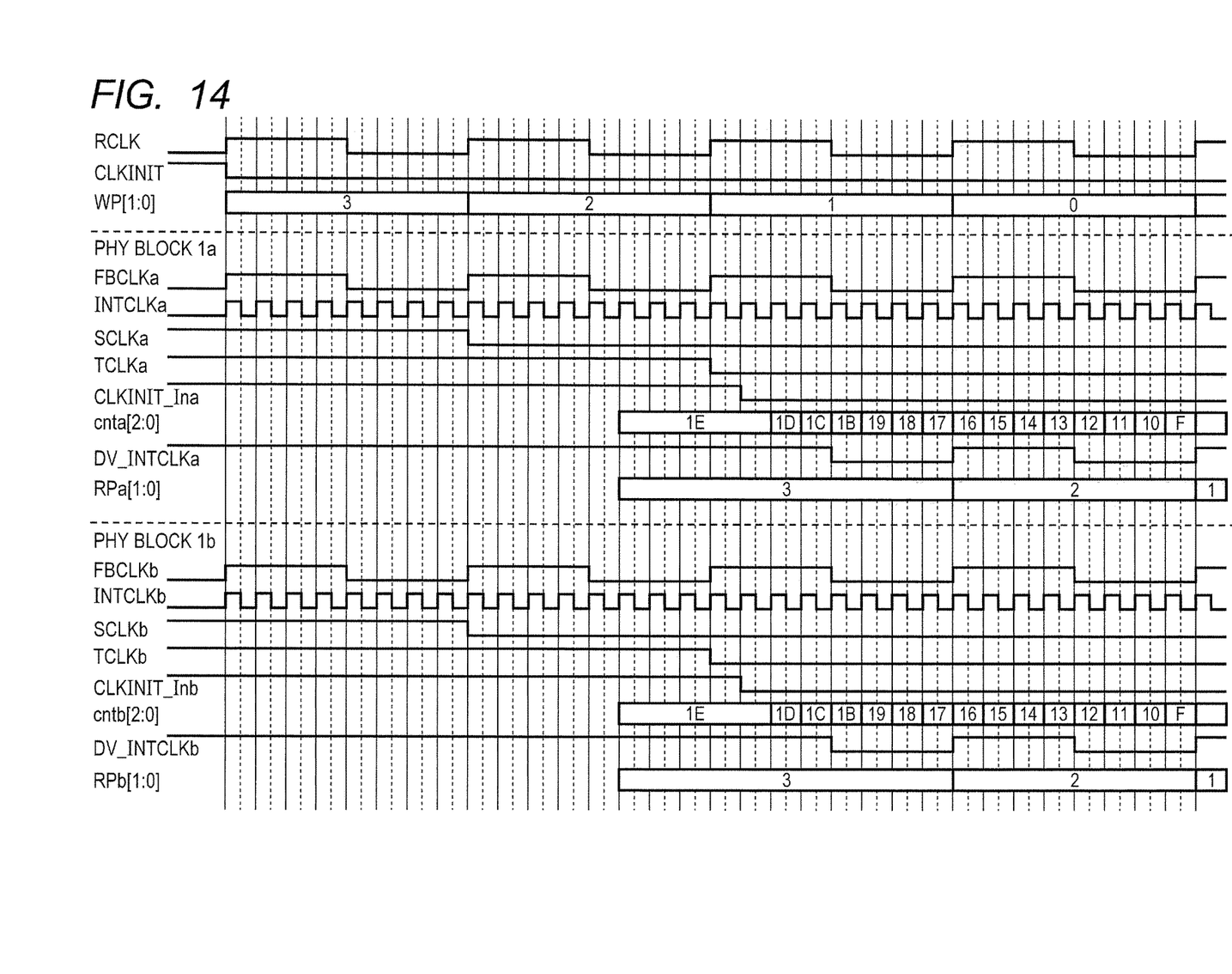
FIG. 14 is a timing chart of the third embodiment.

FIG. 14 is a timing chart of the third embodiment.

At the time of power-on reset, the hint signal generating circuit 104A in the MEMC 104 decreases the hint signal CLKINIT to the low level at the rise timing of the reference clock RCLK.

In the PHY block 1a, the levels of internal signals change as follows.

The local PLL circuit 2a outputs a PLL clock INTCLKa (2133 MHz) synchronized with the phase of the reference clock RCLK and having a frequency obtained by multiplying the frequency of the reference clock RCLK by eight.

The frequency divider 4a divides the PLL clock INTCLKa by eight and outputs the feedback clock FBCLKa (267 MHz).

The flip flop 5a takes (latches) the hint signal CLKINIT of the low level at the rise timing of the reference clock RCLK and outputs the clock SCLKa.

The flip flop 6a takes (latches) the clock SCLKa of the low level at the rise timing of the feedback clock FBCLKa and outputs the clock TCLKa.

The flip flop 7a takes (latches) the clock TCLKa of the low level at the rise timing of the PLL clock INTCLKa and outputs the clock CLKINIT_INa.

After the clock CLKINIT_INa changes to the low level, the clock generator 3a decreases a count signal cnta[0:4] of five bits from the initial value "1E" (displayed in hexadecimal notation) by one at each rise timing of the PLL clock INTCLKa.

In a manner similar to the second embodiment, since the frequency-divided PLL clock DV_INTCLKa (267 MHz) corresponds to the count signal cnta[2], the timing when the level of the frequency-divided PLL clock DV_INTCLKa changes becomes the same as the timing when the level of the feedback clock FBCLKa and the reference clock RCLK changes.

Since the read pointer RPa corresponds to a count signal cnta[3:4] of two bits, the read pointer RPa decreases from the initial value [3] by one at each rise timing of the frequency-divided PLL clock DV_INTCLKa.

Also in the PHY block 1b, like in the PHY block 1a, the levels of the internal signals change.

In the third embodiment, in a manner similar to the second embodiment, the frequency-divided PLL clock DV_INTCLKb (267 MHz) output from the clock generator 3b corresponds to the count signal cntb[2], so that the timing when the level of the frequency-divided PLL clock DV_INTCLKb changes becomes the same as the timing when the level of the feedback clock FBCLKb and the reference clock RCLK changes. The read pointer RPb decreases from the initial value "3" by one at each rise timing of the frequency-divided PLL clock DV_INTCLKb.

As described above, also in the third embodiment, in a manner similar to the second embodiment, each of the phase of the frequency-divided PLL clock DV_INTCLKa generated by the PHY block 1a and the phase of the frequency-divided PLL clock DV_INTCLKb generated by the PHY block 1b becomes the same as the phase of the reference clock RCLK.

Therefore, in the third embodiment, in a manner similar to the second embodiment, the timing when data is output from the FIFO buffer 8a in the PHY block 1a and the timing when data is output from the FIFO buffer 8b in the PHY block 1b become the same. Consequently, the problem as described with reference to FIG. 4 that the command-data interval required by the DRAM standard becomes unachievable can be avoided.

In the embodiment, the timing when the read pointer RPa generated by the PHY block 1a changes and the timing when the read pointer RPb generated by the PHY block 1b changes become the same. Consequently, the problem as described with reference to FIG. 5 that the command-data interval required by the DRAM standard becomes unachievable can be avoided.

The write pointer WP is also generated on the basis of the hint signal CLKINIT. Specifically, the MEMC 104 starts changing from the initial value of the write pointer WP at the timing when the hint signal CLKINIT changes to the low level, and changes the value of the write pointer WP at the timing when the reference clock RCLK rises, so that the timing difference between the write pointer WP and the read pointers RPa and RPb can be accurately controlled.

Modifications

The present invention is not limited to the foregoing embodiments but includes, for example, the following modifications.

(1) Control of Hint Signal CLKINIT

The hint signal CLKINIT may be periodically decreased to the L level.

In the embodiment of the present invention, the hint signal generating circuit 104A changes the level of the hint signal CLKINIT to the low level synchronously with the reference clock RCLK at the time of power-on reset of the semiconductor device 101. However, the invention is not limited to the embodiment.

For example, in the case where the semiconductor device 101 can be shifted to a low-power-consumption mode (such as a sleep mode), the hint signal generating circuit 104A may change the level of the hint signal CLKINIT to the low level synchronously with the reference clock RCLK at the time of return from the low-power-consumption mode. Alternatively, the hint signal generating circuit 104A may periodically change the level of the hint signal CLKINIT to the low level synchronously with the reference clock RCLK.

Although the invention achieved by the present inventors has been concretely described on the basis of the embodiments, obviously, the present invention is not limited to the embodiments but can be variously changed without departing from the gist.

What is claimed is:

1. A semiconductor device having a plurality of data transfer blocks to each of which a common external clock and a common start signal are supplied, comprising:
    a local PLL circuit outputting a PLL clock obtained by multiplying the common external clock;
    a frequency divider outputting a feedback clock obtained by frequency-dividing the PLL clock to the local PLL circuit;
    an FIFO buffer temporarily holding data input from the outside;
    a clock generator generating a frequency-divided PLL clock obtained by frequency-dividing the PLL clock,
    a first latch circuit provided for a path through which the common start signal is transmitted and synchronized with the feedback clock; and
    a second latch circuit provided at a posterior stage of the first latch circuit and synchronized with the PLL clock,
    wherein the FIFO buffer outputs held data on the basis of the frequency-divided PLL clock,
    wherein the clock generator controls a phase of the frequency-divided PLL clock on the basis of the common start signal, and
    wherein the clock generator controls the phase of the frequency-divided PLL clock on the basis of an output of the second latch circuit.

2. The semiconductor device according to claim 1, further comprising a third latch circuit provided at an anterior stage of the first latch circuit and synchronized with the common external clock.

3. The semiconductor device according to claim 1, wherein the clock generator includes a down counter which starts counting in response to a change in the level of an output of the second latch circuit and updates a count value synchronously with the PLL clock, and the clock generator outputs the frequency-divided PLL clock based on the count value to the FIFO buffer.

4. The semiconductor device according to claim 3, wherein the clock generator further outputs a read pointer based on the count value to the FIFO buffer, and
    wherein the FIFO buffer outputs held data to a location designated by the read pointer.

5. The semiconductor device according to claim 4, further comprising a memory control circuit generating a write pointer on the basis of the start signal,
    wherein data input from the outside is supplied to a location designated by the write pointer in the FIFO buffer.

* * * * *